D. L. THORNTON.
COTTON CHOPPER AND CULTIVATOR.
APPLICATION FILED MAY 29, 1911.
1,028,402.
Patented June 4, 1912.
3 SHEETS—SHEET 1.
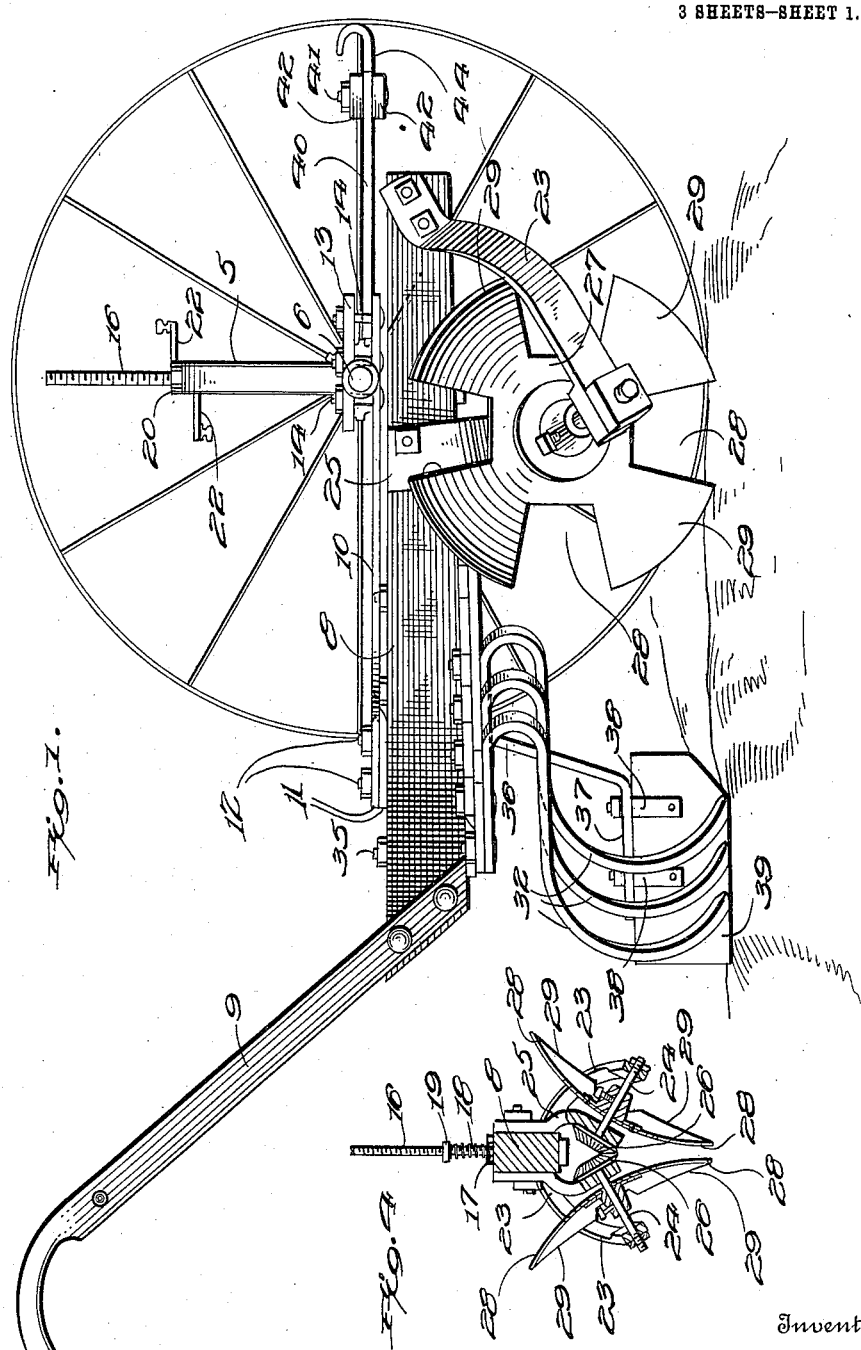

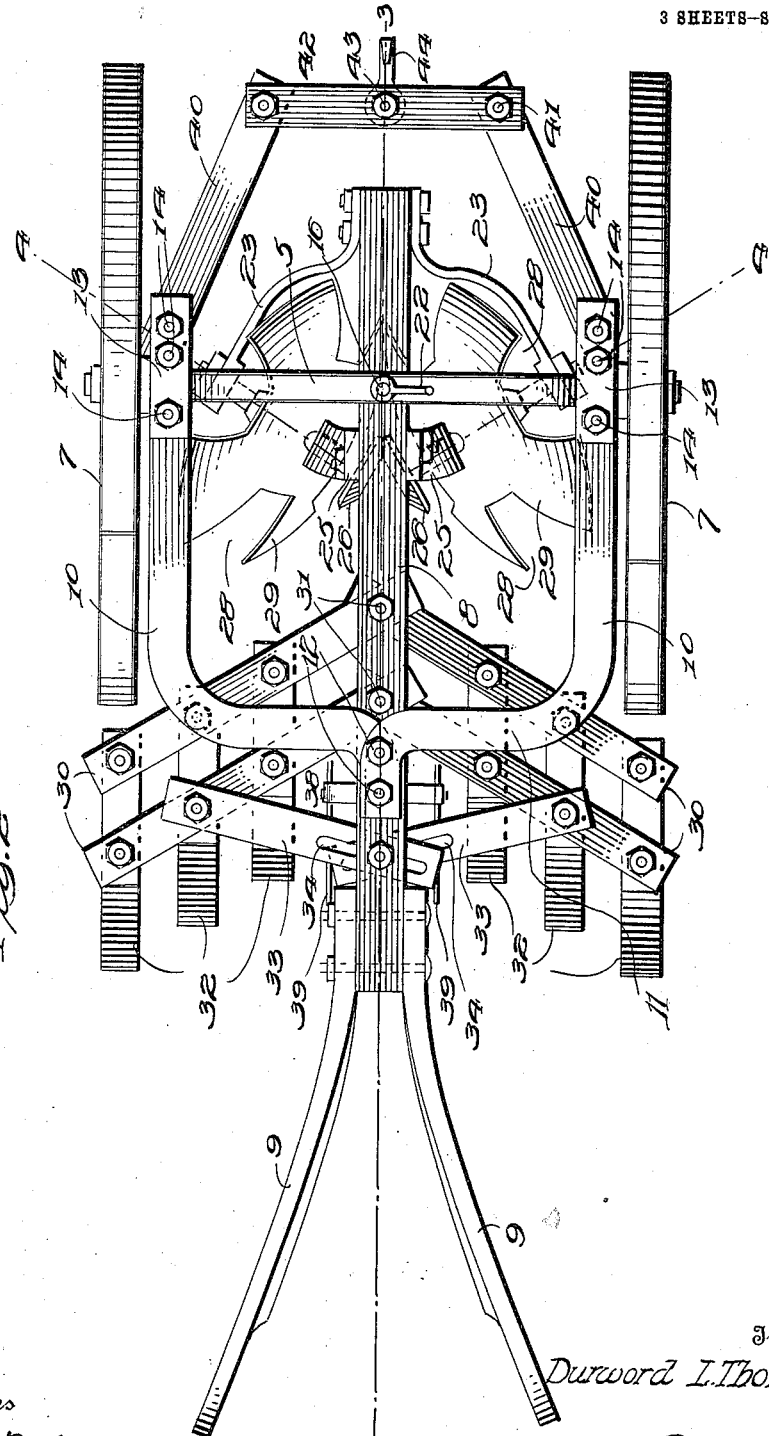

D. L. THORNTON.
COTTON CHOPPER AND CULTIVATOR.
APPLICATION FILED MAY 29, 1911.
1,028,402.
Patented June 4, 1912.
3 SHEETS—SHEET 3.
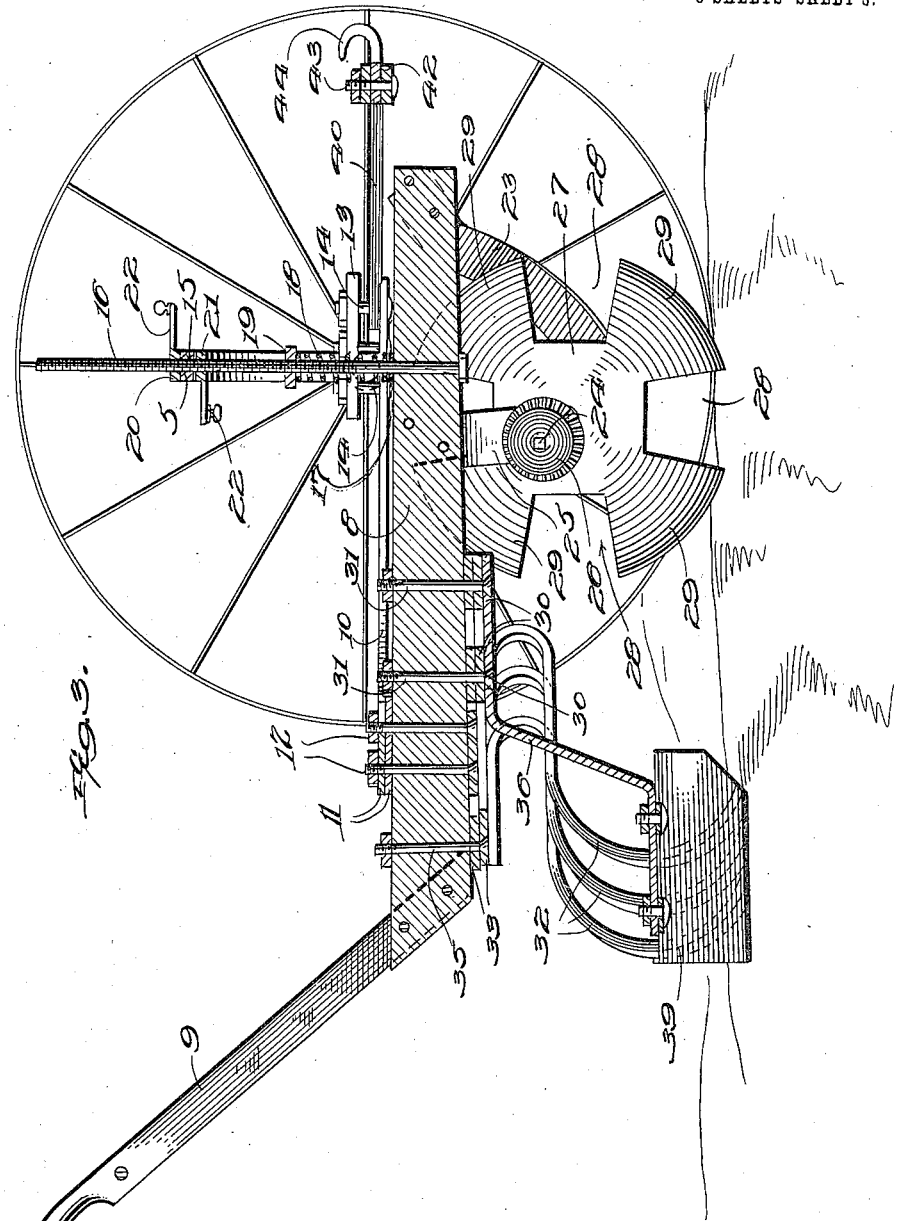
Witnesses
Inventor
Durword L. Thornton
By
his Attorney.

UNITED STATES PATENT OFFICE.

DURWORD L. THORNTON, OF MONROE, GEORGIA.

COTTON CHOPPER AND CULTIVATOR.

1,028,402.  Specification of Letters Patent.  Patented June 4, 1912.

Application filed May 29, 1911. Serial No. 630,087.

*To all whom it may concern:*

Be it known that I, DURWORD L. THORNTON, a citizen of the United States, residing at Monroe, in the county of Walton and State of Georgia, have invented certain new and useful Improvements in Cotton Choppers and Cultivators, of which the following is a specification, reference being had therein to the accompanying drawing.

This invention relates to agricultural machines and the principal object of the same is to provide a cotton chopper and cultivator in which novel choppers are employed as well as novel cultivator teeth, means being provided for vertically adjusting the forward end of the machine so that when necessary or desirable the choppers can be raised clear of the ground.

The invention also contemplates novel draft rigging by means of which the draft animal, or animals, can travel to one side of the path of movement of the machine or in front of the machine.

A preferred and practical embodiment of the invention is shown in the accompanying drawings, wherein:—

Figure 1 is a view in side elevation of the improved agricultural machine, one of the supporting wheels being omitted. Fig. 2 is a top plan view thereof. Fig. 3 is a central vertical longitudinal sectional view taken on the line 3—3, Fig. 2. Fig. 4 is a vertical transverse sectional view taken on the line 4—4, Fig. 2.

The improved agricultural machine comprises an arched axle 5, the spindles 6 of which carry the supporting wheels 7. The chopping and excavating devices (to be specifically referred to) are carried by a central beam 8 the forward portion of which is straddled by the arch of axle 5, the rear end of said beam being provided with the handles 9. Supporting spring arms 10 that are disposed on opposite sides of beam 8 have their inturned rear ends 11 connected to the said beam 8 by the bolts 12, and their forward ends are clamped to the axle spindles 6 by the straps 13 and bolts 14. The central portion of the arch of axle 5 is provided with a transverse opening 15 through which an externally threaded adjusting bolt 16 is slidable. Bolt 16 extends vertically through the forward portion of beam 8. Bolt 16 is loose in beam 8 and carries a lower collar 17 upon which the lower end of a spring 18 that is coiled about said bolt rests. The upper end of spring 18 abuts a nut 19 that is adjustable on bolt 16 for regulating the tension of spring 18. The bolt 16 is adjusted vertically relative to axle 5 by means of the nuts 20 and 21 that are carried by said bolt and engage, respectively the upper and lower surfaces of said axle. The nuts 20 and 21 are equipped with handles 22 by means of which the nuts can be manually manipulated to adjust the bolt 16 vertically.

From the foregoing description it will be clear that the forward end of beam 8 can be vertically adjusted relative to the axle 5, and that the spring 18 permits the said beam to have a limited movement on the bolt 16 to absorb shocks and jars incidental to the operation of the machine.

Outwardly curved, downwardly projecting inclined hanger arms 23 project rearwardly from opposite sides of the forward end of beam 8 and their free ends have the outer ends of the chopper shafts 24 journaled therein. The inner ends of shafts 24 are journaled in and project through hanger bearings 25 that depend from opposite sides of beam 8. The arms 22 and 25 retain the shafts 24 in divergent relation and the inner ends of said shafts 24 carry beveled gears 26 that are in mesh to cause said shafts 24 to rotate in unison. Chopper disks 27 are carried by the shafts 24, said disks being concaved and provided with radial slots 28 that provide a plurality of radiating blades 29.

Two or more sets of bars 30 have their inner ends pivotally connected to the bottom surface of beam 8 by the bolts 31. The sets of bars 30 project laterally from the beam 8 and carry the cultivating teeth 32. The teeth 32 connect the members of each set of bars 30 in spaced parallel relation. Adjusting links 33 have their outer ends pivotally connected to the outer portions of the bars 30 and their inner ends are arranged in crossing relation and provided with longitudinal slots 34 through which a bolt 35 projects that depends from the beam 8. Bolt 35 permits the links 33 to be moved to obtain adjustments of the cultivator bars 30, as will be clear. A hanger bar 36 depends from the bottom of the beam 6 and its longitudinally arranged rear end 37 has the transversely arranged straps 38 fastened thereto, said straps carrying the shovels 39.

The forward bolts 14 of the clamping straps 13 have the rear ends of links 40 pivotally connected thereto. The forward ends of links 40 are pivotally connected to the end bolts 41 that connect the draft bars 42. Draft bars 42 are also connected by the central bolt 43 on which the hook 44 is pivotally mounted, said hook being adapted for engagement with the whiffle-tree not shown, to which the draft animal is attached. As will be clear, the use of the links 40 for connecting the bars 42 to the forward end of the machine permits the draft animal to travel in front of beam 8 or to either side thereof without affecting the direction of travel of the machine.

It will be understood from the foregoing that this invention provides means whereby the choppers can be adjusted vertically to regulate the depth of cut made and also to lift the same clear of the ground to facilitate transportation of the machine.

The arrangement of the shafts 24 is such that the choppers 27 are in divergent relation, and their slots 28 are in alinement and the gears 26 cause said choppers to rotate in unison. This arrangement of choppers causes the same to practically meet at the ground so their blades 29 will cut the cotton and throw the same out at that point, and that the alined notches leaves a "skip" space for the cotton to remain.

What I claim as my invention is:—

1. An agricultural machine comprising an axle, wheels carried thereby, a beam, supporting arms connected to the rear portion of said beam, means connecting said arms to said axle, means for adjustably connecting the forward portion of said beam to said axle, hanger bearings carried by opposite sides of said beam, shafts journaled in said bearings and supported in divergent relation, gear connections between the inner ends of said shafts, and chopping means carried by said shafts.

2. An agricultural machine comprising an arched axle, wheels carried by the spindles thereof, a beam, supporting arms provided with inturned rear ends, means for connecting the rear ends of said arms to the rear portion of said beam, means for rigidly connecting the forward ends of said arms to said axle, adjusting means for connecting the forward end of said beam to said axle, chopping means carried by the forward portion of said beam, and cultivating means carried by the rear portion of said beam.

3. An agricultural machine comprising an arched axle, wheels therefor, a beam, means for connecting the rear portion of said beam to said axle, an adjusting bolt extending through the forward end of said beam and the central portion of said axle, nuts on said bolt for engaging the upper and lower surfaces of said axle, handles carried by said nuts, a spring coiled about said bolt and bearing upon said beam, means carried by said bolt for regulating the tension of said spring, chopping means carried by said beam, and cultivating means carried by said beam.

In testimony whereof I hereunto affix my signature in presence of two witnesses.

DURWORD L. THORNTON.

Witnesses:
N. L. GALLAWAY,
J. O. LAWRENCE.

---

Copies of this patent may be obtained for five cents each, by addressing the "Commissioner of Patents, Washington, D. C."